US012573109B2

(12) United States Patent (10) Patent No.: US 12,573,109 B2
Na et al. (45) Date of Patent: Mar. 10, 2026

(54) CUSTOMIZED PROP IMAGE GENERATION METHOD AND APPARATUS

(71) Applicant: SHANGHAI BILIBILI TECHNOLOGY CO., LTD., Shanghai (CN)

(72) Inventors: Zhicheng Na, Shanghai (CN); Bo Chu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 192 days.

(21) Appl. No.: 18/400,936

(22) Filed: Dec. 29, 2023

(65) Prior Publication Data

US 2024/0221255 A1 Jul. 4, 2024

(30) Foreign Application Priority Data

Dec. 30, 2022 (CN) .......................... 202211732494.3

(51) Int. Cl.
*G06T 11/60* (2026.01)
*G06T 5/50* (2006.01)
*G06T 7/70* (2017.01)
*G06T 7/90* (2017.01)
*G06V 40/16* (2022.01)
*G06V 40/20* (2022.01)

(52) U.S. Cl.
CPC ................ *G06T 11/60* (2013.01); *G06T 5/50* (2013.01); *G06T 7/70* (2017.01); *G06T 7/90* (2017.01); *G06V 40/174* (2022.01); *G06V 40/20* (2022.01); *G06T 2207/10024* (2013.01); *G06T 2207/20221* (2013.01)

(58) Field of Classification Search
CPC ....................................................... G06T 11/60
See application file for complete search history.

(56) References Cited

U.S. PATENT DOCUMENTS

2021/0264444 A1* 8/2021 Chen ........................ G06T 11/00
2022/0237829 A1* 7/2022 Ren .......................... G06T 11/00
2023/0356083 A1* 11/2023 Kuang .................. A63F 13/426

* cited by examiner

*Primary Examiner* — Shivang I Patel
(74) *Attorney, Agent, or Firm* — BakerHostetler

(57) ABSTRACT

This application provides techniques for generating customized prop images. The techniques comprise obtaining an initial prop image that comprises a target object, wherein the initial prop image comprises an initial image of any prop among at least one prop held by a target online streamer; obtaining an action file configured to specify an action of the target object; parsing the action file to determine a target action corresponding to the action file; and generating a customized prop image by updating a current action of the target object in the initial prop image to the target action, wherein the customized prop image corresponds to the target online streamer.

20 Claims, 7 Drawing Sheets

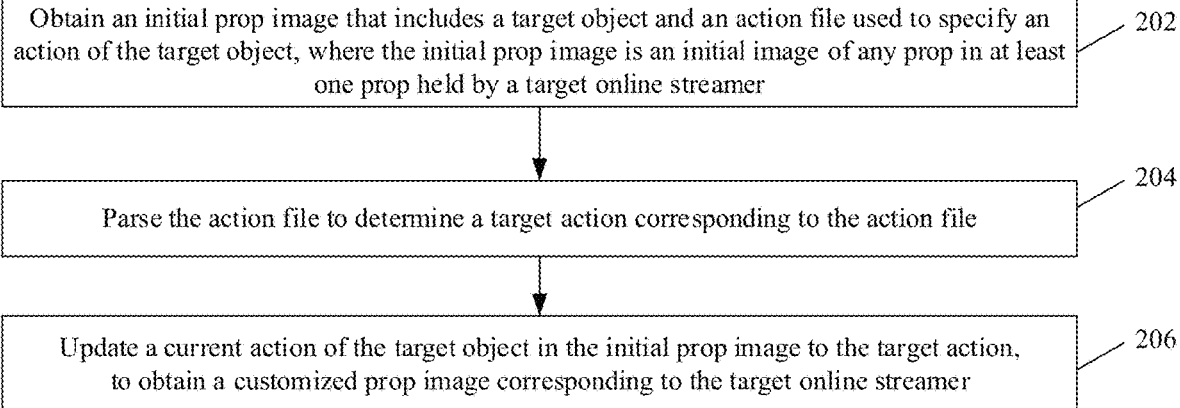

Obtain an initial prop image that includes a target object and an action file used to specify an
action of the target object, where the initial prop image is an initial image of any prop in at least
one prop held by a target online streamer                                                        202

Parse the action file to determine a target action corresponding to the action file              204

Update a current action of the target object in the initial prop image to the target action,
to obtain a customized prop image corresponding to the target online streamer                    206

FIG. 2

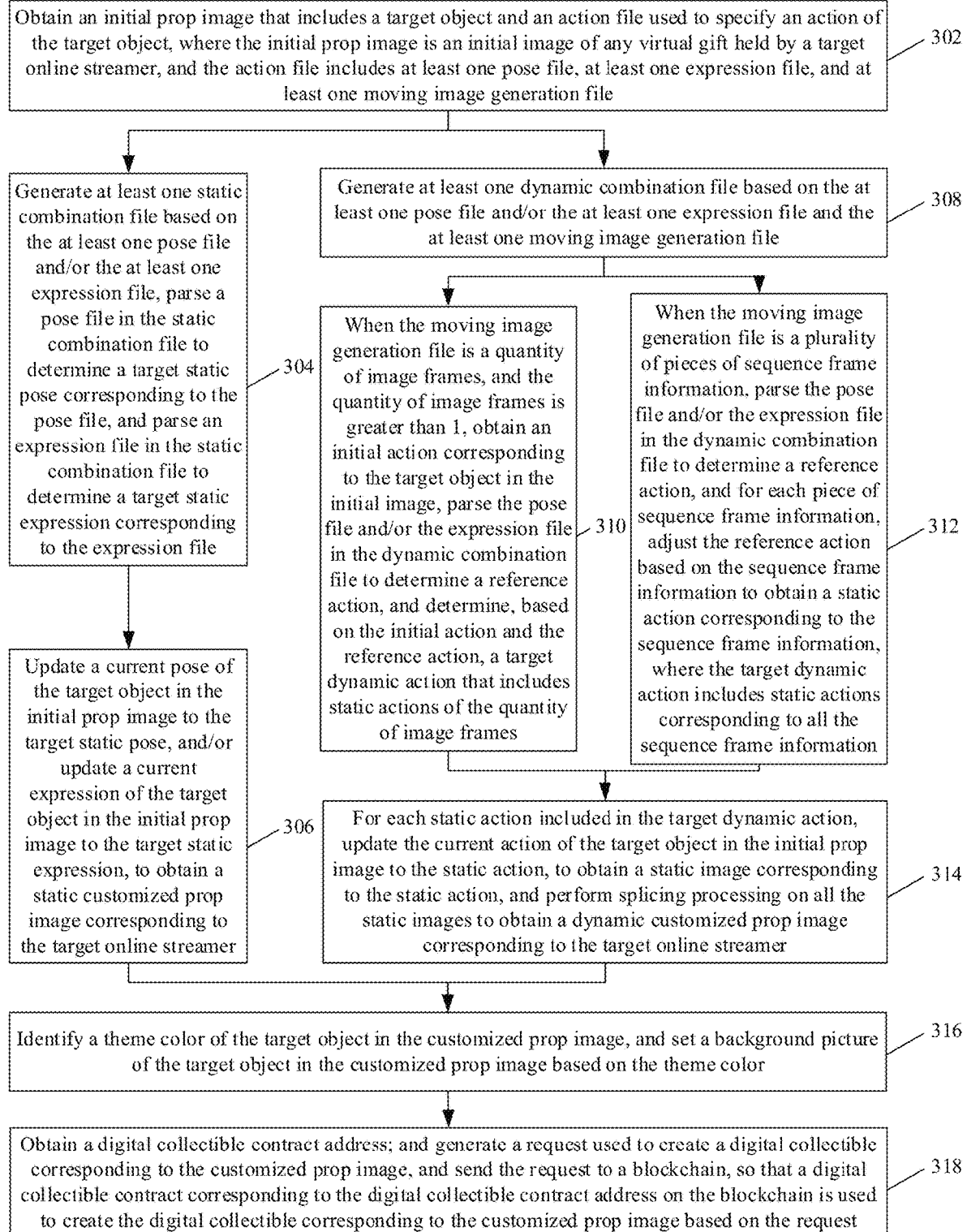

Obtain an initial prop image that includes a target object and an action file used to specify an action of the target object, where the initial prop image is an initial image of any virtual gift held by a target online streamer, and the action file includes at least one pose file, at least one expression file, and at least one moving image generation file — 302

Generate at least one static combination file based on the at least one pose file and/or the at least one expression file, parse a pose file in the static combination file to determine a target static pose corresponding to the pose file, and parse an expression file in the static combination file to determine a target static expression corresponding to the expression file — 304

Generate at least one dynamic combination file based on the at least one pose file and/or the at least one expression file and the at least one moving image generation file — 308

When the moving image generation file is a quantity of image frames, and the quantity of image frames is greater than 1, obtain an initial action corresponding to the target object in the initial image, parse the pose file and/or the expression file in the dynamic combination file to determine a reference action, and determine, based on the initial action and the reference action, a target dynamic action that includes static actions of the quantity of image frames — 310

When the moving image generation file is a plurality of pieces of sequence frame information, parse the pose file and/or the expression file in the dynamic combination file to determine a reference action, and for each piece of sequence frame information, adjust the reference action based on the sequence frame information to obtain a static action corresponding to the sequence frame information, where the target dynamic action includes static actions corresponding to all the sequence frame information — 312

Update a current pose of the target object in the initial prop image to the target static pose, and/or update a current expression of the target object in the initial prop image to the target static expression, to obtain a static customized prop image corresponding to the target online streamer — 306

For each static action included in the target dynamic action, update the current action of the target object in the initial prop image to the static action, to obtain a static image corresponding to the static action, and perform splicing processing on all the static images to obtain a dynamic customized prop image corresponding to the target online streamer — 314

Identify a theme color of the target object in the customized prop image, and set a background picture of the target object in the customized prop image based on the theme color — 316

Obtain a digital collectible contract address; and generate a request used to create a digital collectible corresponding to the customized prop image, and send the request to a blockchain, so that a digital collectible contract corresponding to the digital collectible contract address on the blockchain is used to create the digital collectible corresponding to the customized prop image based on the request — 318

FIG. 3D

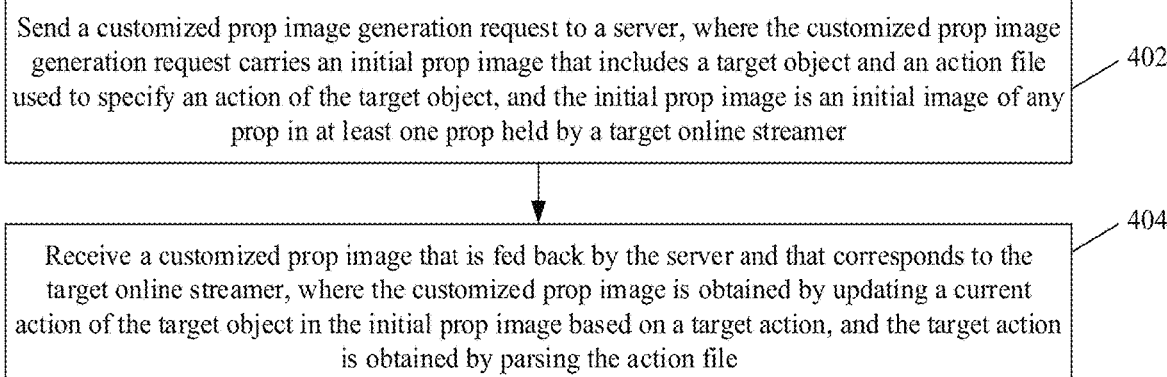

Send a customized prop image generation request to a server, where the customized prop image generation request carries an initial prop image that includes a target object and an action file used to specify an action of the target object, and the initial prop image is an initial image of any prop in at least one prop held by a target online streamer
— 402

Receive a customized prop image that is fed back by the server and that corresponds to the target online streamer, where the customized prop image is obtained by updating a current action of the target object in the initial prop image based on a target action, and the target action is obtained by parsing the action file
— 404

FIG. 4

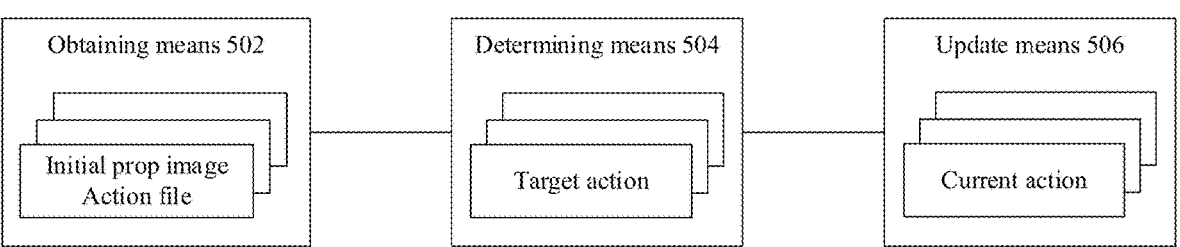

| Obtaining means 502 | Determining means 504 | Update means 506 |
| --- | --- | --- |
| Initial prop image Action file | Target action | Current action |

FIG. 5

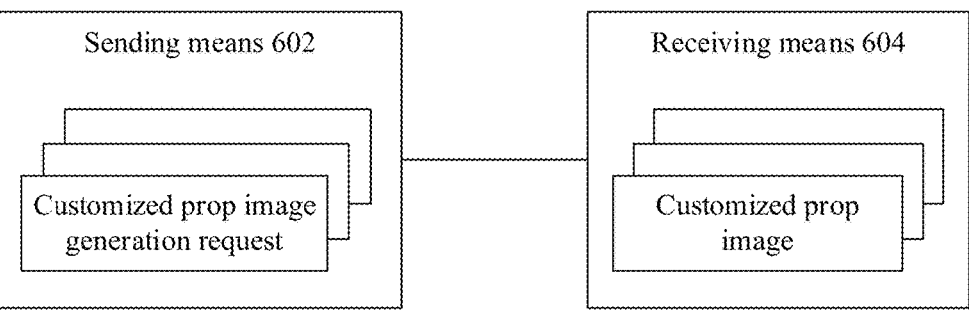

| Sending means 602 | Receiving means 604 |
| --- | --- |
| Customized prop image generation request | Customized prop image |

FIG. 6

CUSTOMIZED PROP IMAGE GENERATION METHOD AND APPARATUS

CROSS-REFERENCE TO RELATED APPLICATION

The present application claims priority to Chinese Patent Application No. 202211732494.3, filed on Dec. 30, 2022, which is incorporated herein by reference in its entirety.

BACKGROUND

With continuous development of computer technologies, online social platforms are increasingly popular, and livestreaming on the online social platform gradually becomes a popular form of real-time interaction. Improvements in living streaming are desired.

SUMMARY

In view of this, embodiments of this application provide a customized prop image generation method. This application also relates to a customized prop image generation apparatus, a computing device, and a computer-readable storage medium, to resolve a problem in the conventional technology that props lacks distinctiveness.

According to a first aspect of the embodiments of this application, a customized prop image generation method is provided, including:

obtaining an initial prop image that includes a target object and an action file used to specify an action of the target object, where the initial prop image is an initial image of any prop in at least one prop held by a target online streamer;

parsing the action file to determine a target action corresponding to the action file; and updating a current action of the target object in the initial prop image to the target action, to obtain a customized prop image corresponding to the target online streamer.

Optionally, the action file includes at least one pose file and/or at least one expression file;

the parsing the action file to determine a target action corresponding to the action file includes:

generating at least one static combination file based on the at least one pose file and/or the at least one expression file, where the static combination file includes a pose file and/or an expression file; and parsing the static combination file to determine a target static action corresponding to the static combination file; and the updating a current action of the target object in the initial prop image to the target action, to obtain a customized prop image corresponding to the target online streamer includes:

updating the current action of the target object in the initial prop image to the target static action, to obtain a static customized prop image corresponding to the target online streamer.

Optionally, the target static action includes a target static pose and/or a target static expression; and the parsing the static combination file to determine a target static action corresponding to the static combination file includes:

parsing the pose file in the static combination file to determine a target static pose corresponding to the pose file, and/or parsing the expression file in the static combination file to determine a target static expression corresponding to the expression file.

Optionally, the updating the current action of the target object in the initial prop image to the target static action, to obtain a static customized prop image corresponding to the target online streamer includes:

updating a current pose of the target object in the initial prop image to the target static pose, and/or updating a current expression of the target object in the initial prop image to the target static expression, to obtain the static customized prop image corresponding to the target online streamer.

Optionally, the action file includes at least one pose file and/or at least one expression file, and includes at least one moving image generation file;

the parsing the action file to determine a target action corresponding to the action file includes:

generating at least one dynamic combination file based on the at least one pose file and/or the at least one expression file and the at least one moving image generation file, where the dynamic combination file includes a pose file and/or an expression file, and includes a moving image generation file; and parsing the dynamic combination file to determine a target dynamic action corresponding to the dynamic combination file; and the updating a current action of the target object in the initial prop image to the target action, to obtain a customized prop image corresponding to the target online streamer includes:

updating the current action of the target object in the initial prop image to the target dynamic action, to obtain a dynamic customized prop image corresponding to the target online streamer.

Optionally, the moving image generation file is a quantity of image frames, and the quantity of image frames is greater than 1; and the parsing the dynamic combination file to determine a target dynamic action corresponding to the dynamic combination file includes:

obtaining an initial action corresponding to the target object in the initial image, and parsing the pose file and/or the expression file in the dynamic combination file to determine a reference action; and determining, based on the initial action and the reference action, a target dynamic action that includes static actions of the quantity of image frames.

Optionally, the moving image generation file is a plurality of pieces of sequence frame information; and the parsing the dynamic combination file to determine a target dynamic action corresponding to the dynamic combination file includes:

parsing the pose file and/or the expression file in the dynamic combination file to determine a reference action; and for each piece of sequence frame information, adjusting the reference action based on the sequence frame information to obtain a static action corresponding to the sequence frame information, where the target dynamic action includes static actions corresponding to all the sequence frame information.

Optionally, the updating the current action of the target object in the initial prop image to the target dynamic action, to obtain a dynamic customized prop image corresponding to the target online streamer includes:

for each static action included in the target dynamic action, updating the current action of the target object in the initial prop image to the static action, to obtain a static image corresponding to the static action; and performing splicing processing on all the static images to obtain the dynamic customized prop image corresponding to the target online streamer.

Optionally, after the updating a current action of the target object in the initial prop image to the target action, to obtain a customized prop image corresponding to the target online streamer, the method further includes:

identifying a theme color of the target object in the customized prop image; and setting a background picture of the target object in the customized prop image based on the theme color.

Optionally, after the updating a current action of the target object in the initial prop image to the target action, to obtain a customized prop image corresponding to the target online streamer, the method further includes:

obtaining a digital collectible contract address; and generating a request used to create a digital collectible corresponding to the customized prop image, and sending the request to a blockchain, so that a digital collectible contract corresponding to the digital collectible contract address on the blockchain is used to create the digital collectible corresponding to the customized prop image based on the request.

Optionally, the initial prop image is a model resource required for constructing a model.

According to a second aspect of the embodiments of this application, a customized prop image generation method is provided, applied to a client, and including:

sending a customized prop image generation request to a server, where the customized prop image generation request carries an initial prop image that includes a target object and an action file used to specify an action of the target object, and the initial prop image is an initial image of any prop in at least one prop held by a target online streamer; and receiving a customized prop image that is fed back by the server and that corresponds to the target online streamer, where the customized prop image is obtained by updating a current action of the target object in the initial prop image based on a target action, and the target action is obtained by parsing the action file.

Optionally, before the sending a customized prop image generation request to a server, the method further includes:

sending a generation element obtaining request to the server, where the generation element obtaining request is used to obtain an element required for generating the customized prop image;

receiving at least one initial prop image and at least one action file that are fed back by the server based on the generation element obtaining request;

determining, from the at least one initial prop image, an initial prop image specified by the target online streamer, and determining, from the at least one action file, an action file specified by the target online streamer; and generating a customized prop image generation request that carries the specified initial prop image and the specified action file.

According to a third aspect of the embodiments of this application, a customized prop image generation apparatus is provided, including:

an obtaining means, configured to obtain an initial prop image that includes a target object and an action file used to specify an action of the target object, where the initial prop image is an initial image of any prop in at least one prop held by a target online streamer;

a determining means, configured to parse the action file to determine a target action corresponding to the action file; and an update means, configured to update a current action of the target object in the initial prop image to the target action, to obtain a customized prop image corresponding to the target online streamer.

According to a fourth aspect of the embodiments of this application, a customized prop image generation apparatus is provided, applied to a client, and including:

a sending means, configured to send a customized prop image generation request to a server, where the customized prop image generation request carries an initial prop image that includes a target object and an action file used to specify an action of the target object, and the initial prop image is an initial image of any prop in at least one prop held by a target online streamer; and a receiving means, configured to receive a customized prop image that is fed back by the server and that corresponds to the target online streamer, where the customized prop image is obtained by updating a current action of the target object in the initial prop image based on a target action, and the target action is obtained by parsing the action file.

According to a fifth aspect of the embodiments of this application, a computing device is provided, including a memory, a processor, and computer instructions stored in the memory and capable of running on the processor, where the processor executes the computer instructions to implement steps of the customized prop image generation method.

According to a sixth aspect of the embodiments of this application, a computer-readable storage medium is provided, where the computer-readable storage medium stores computer instructions, and the computer instructions are executed by a processor to implement steps of the customized prop image generation method.

Based on the customized prop image generation method provided in this application, the initial prop image that includes the target object and the action file used to specify the action of the target object are obtained, where the initial prop image is an initial image of any prop in the at least one prop held by the target online streamer; the action file is parsed to determine the target action corresponding to the action file; and the current action of the target object in the initial prop image is updated to the target action, to obtain the customized prop image corresponding to the target online streamer. The current action of the target object in the initial prop image can be automatically updated by using the action file, to generate a customized prop image that is unique and distinctive, and props can be distinctive for different online streamers, so that props that can be obtained by different users can be specialized, thereby improving user experience.

BRIEF DESCRIPTION OF DRAWINGS

FIG. 2 is a flowchart of a customized prop image generation method according to an embodiment of this application;

FIG. 3D is a processing flowchart of a customized prop image generation method applied to a virtual gift according to an embodiment of this application;

FIG. 4 is a flowchart of another customized prop image generation method according to an embodiment of this application;

FIG. 5 is a schematic diagram of a structure of a customized prop image generation apparatus according to an embodiment of this application;

FIG. 6 is a schematic diagram of a structure of another customized prop image generation apparatus according to an embodiment of this application.

DESCRIPTION OF EMBODIMENTS

Figure 1A:
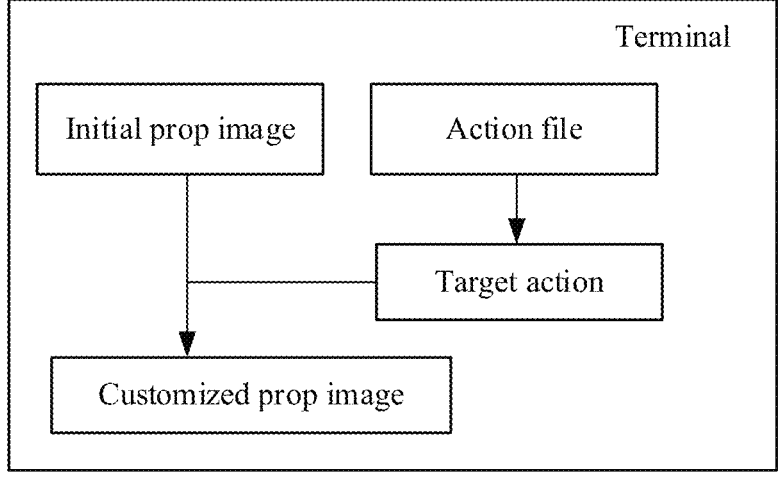
FIG. 1A is a schematic diagram of a structure of a customized prop image generation system according to an embodiment of this application.

Many specific details are described in the following description to facilitate full understanding of this application. However, this application can be implemented in many other manners different from those described herein, and a person skilled in the art can make similar promotion without departing from the connotation of this application. Therefore, this application is not limited by specific implementations disclosed below.

Terms used in one or more embodiments of this application are merely for the purpose of describing a specific embodiment, and are not intended to limit the one or more embodiments of this application. The terms "a", "the", and "said" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to distinguish between information of the same type. For example, without departing from the scope of one or more embodiments of this application, "first" may also be referred to as "second", and similarly, "second" may also be referred to as "first". Depending on the context, for example, the word "if" used herein can be interpreted as "while", "when", or "in response to determining".

Terms used in one or more embodiments of this application are explained first.

Live2D is an existing drawing rendering technology that can be used to perform operations such as translation, rotation, and deformation on a series of 2D images, to generate a movable model with an animation effect. A basic running process thereof is to combine a Live2D resource and user input on which a series of Live2D program operations and rendering processing are performed to generate a series of graphics that are drawn in a user interface or output to a storage medium.

A digital collectible is a new type of electronic publication, and is a unique digital certificate generated for a corresponding specific work and artwork by using a blockchain technology, to implement real and trustworthy digital distribution, purchase, collection, and use on the basis of protecting a digital copyright thereof. Digital collectibles are generally unique, scarce, aesthetic, and traceable. On this basis, works and artworks that correspond to digital collectibles of an image type are generally generated by disassembling a subject in an image and then designing, for different parts, elements that have different attributes, appearance, and scarcity. Then, elements of different parts are combined in batches to obtain a large quantity of unique images.

A customized prop image generation method provided in this application may be used for a card, and may also be used for an avatar, a cover, a customized gift, or the like. For fan users of an online streamer, the online streamer can select different virtual image skins to generate different series of non-fungible token (NFT) cards.

This application provides a customized prop image generation method. This application also relates to a customized prop image generation apparatus, a computing device, and a computer-readable storage medium. The customized prop image generation method, the customized prop image generation apparatus, the computing device, and the computer-readable storage medium are described in detail one by one in the following embodiments.

The customized prop image generation method provided in the embodiments of this application may be executed by a server, a terminal, or a terminal and a server through joint collaboration. This is not limited in this embodiment of this application.

An example in which the method is executed by a terminal is used. FIG. 1A is a schematic diagram of a structure of a customized prop image generation system according to an embodiment of this application. A user generates a customized prop image by using a terminal. In this case, the terminal correspondingly obtains an initial prop image that includes a target object and an action file used to specify an action of the target object, where the initial prop image is an initial image of any prop in at least one prop held by a target online streamer; the terminal parses the action file to determine a target action corresponding to the action file; and the terminal updates a current action of the target object in the initial prop image to the target action, to obtain a customized prop image corresponding to the target online streamer.

In addition, the terminal may also display the customized prop image by using a display device, so that the user can view the customized prop image.

Figure 1B:
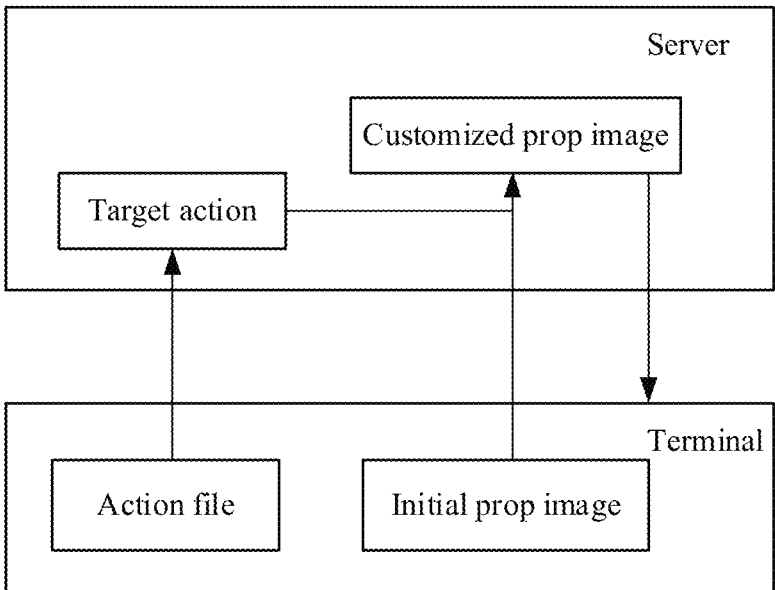
FIG. 1B is a schematic diagram of a structure of another customized prop image generation system according to an embodiment of this application.

A livestreaming platform may configure uniform props for all online streamers, for example, props used for livestreaming revenue, fan badges, and virtual gifts. This improves diversity of livestreaming interaction. However, for different online streamers, props of same purpose are the same, and the props cannot be distinctive based on different online streamers. Props that can be obtained by different users are the same, possessing universality, but lacking user experience. This disclosure describes improved techniques for generating customized props. An example in which the method is executed by a terminal and a server through joint collaboration is used. FIG. 1B is a schematic diagram of a structure of another customized prop image generation system according to an embodiment of this application.

The terminal obtains an initial prop image that includes a target object and an action file used to specify an action of the target object, where the initial prop image is an initial image of any prop in at least one prop held by a target online streamer; and the terminal sends the initial prop image and the action file to the server.

The server parses the action file to determine a target action corresponding to the action file, and updates a current action of the target object in the initial prop image to the target action, to obtain a customized prop image corresponding to the target online streamer.

Correspondingly, the server may further feed back the customized prop image to the terminal, so that the user can view the customized prop image.

It should be noted that a connection is established between the terminal and the server by using a network. The network provides a medium for a communication link between the terminal and the server. The network may include various connection types, for example, a wired communication link, a wireless communication link, or a fiber optic cable. Data transmitted by the terminal may need to undergo processing such as coding, transcoding, and compression before being published to the server.

The terminal may be a browser, an application (APP), or a web application such as a HyperText Markup Language 5 (H5) application, a light application (also referred to as a mini program that is a lightweight application), or a cloud application. The terminal may be developed based on a software development kit (SDK) of a corresponding service, for example, based on a real-time communication (RTC) SDK. The terminal may be deployed in an electronic device, and needs to run by depending on the device or some APPs in the device. For example, the electronic device may have a display screen and support information browsing, for example, may be a mobile computing device such as a mobile phone, a tablet computer, or a personal computing device. Generally, various other types of applications may be configured on the electronic device, for example, an application of a human-computer dialogue type, an application of a model training type, an application of a text processing type, an application of a web browser, an application of a shopping type, an application of a search type, an instant messaging tool, a mailbox-end device, and social platform software.

The server may include a server that provides various services, for example, a server that provides a communication service for a plurality of terminals, a server that is used for background training and that provides support for a model used on the terminal, and a server for processing data sent by the terminal. It should be noted that the server may be implemented as a distributed server cluster including a plurality of servers, or may be implemented as a single server. Alternatively, the server may be a server of a distributed system, or a server integrated with a blockchain. Alternatively, the server may be a cloud server providing a basic cloud computing service such as a cloud service, a cloud database, cloud computing, a cloud function, cloud storage, a network service, cloud communication, a middleware service, a domain name service, a security service, a content delivery network (CDN), and big data and an artificial intelligence platform, or an intelligent cloud computing server or an intelligent cloud host that is equipped with an artificial intelligence technology.

Based on the customized prop image generation method provided in this application, the initial prop image that includes the target object and the action file used to specify the action of the target object are obtained, where the initial prop image is an initial image of any prop in the at least one prop held by the target online streamer; the action file is parsed to determine the target action corresponding to the action file; and the current action of the target object in the initial prop image is updated to the target action, to obtain the customized prop image corresponding to the target online streamer. The current action of the target object in the initial prop image can be automatically updated by using the action file, to generate a customized prop image that is unique and distinctive, and props can be distinctive for different online streamers, so that props that can be obtained by different users can be specialized, thereby improving user experience.

FIG. 2 is a flowchart of a customized prop image generation method according to an embodiment of this application. The method specifically includes the following steps:

Step 202: Obtain an initial prop image that includes a target object and an action file used to specify an action of the target object, where the initial prop image is an initial image of any prop in at least one prop held by a target online streamer.

Specifically, the target object is a subject or an object presented in an image, and may be a virtual character, object, animal, or the like. The target online streamer may be a virtual online streamer, or may be a real online streamer. The prop may be a prop purchased by the online streamer, such as a virtual image or a virtual gift, or may be some functional props such as cards, badges, and avatars that are set by a livestreaming platform for the online streamer. The action file may be a single file, or may be a set of a plurality of files, and is used to specify the action of the target object.

In actual application, there are a plurality of manners of obtaining the initial prop image and the action file. For example, a user may send an instruction for obtaining the initial prop image and the action file or a customized prop image generation instruction to an execution body. Correspondingly, after receiving the obtaining instruction, the execution body starts to obtain the initial prop image and the action file. Alternatively, the execution body may automatically obtain the initial prop image and the action file at an interval of preset duration. For example, after the preset duration, a server that has a customized prop image generation function automatically obtains the initial prop image and the action file in a specified access region. A manner of obtaining the initial prop image and the action file is not limited in this specification.

For example, if the user needs to customize the initial prop image that includes the target object, the user adds, to an upload interface of a customized prop image generation platform, the initial prop image that includes the target object and the action file used to specify the action of the target object, and then clicks an OK control in the upload interface, so that the execution body correspondingly obtains the initial prop image and the action file.

Step 204: Parse the action file to determine a target action corresponding to the action file.

Specifically, the target action is an action of the target object in a finally generated customized prop image.

In one or more optional embodiments of this specification, the action file includes at least one sub-action file. At least one target sub-action file may be selected from the at least one sub-action file for parsing to obtain sub-target actions corresponding to all target sub-action files, and then the sub-target actions are combined to obtain the target action.

It should be noted that all the sub-action files may be a file for specifying actions of different parts of the target object.

In one or more optional embodiments of this specification, the action file includes a pose file and an expression file. The pose file and the expression file may be separately parsed to obtain a target pose corresponding to the pose file and a target expression corresponding to the expression file. Then, the target pose and the target expression are combined to obtain the target action.

In one or more optional embodiments of this specification, the action file includes a pose file, the pose file may be parsed to obtain a target pose corresponding to the pose file, and the target pose is used as the target action.

In one or more optional embodiments of this specification, the action file includes an expression file, the expression file may be parsed to obtain a target expression corresponding to the expression file, and the target expression is used as the target action.

It should be noted that the initial prop image may be a picture, for example, a picture including a small flower. Alternatively, the initial prop image may be a model resource required for constructing a model, such as a Live2D model or a 3D model used to construct a virtual image. This is not limited in this application.

Step 206: Update a current action of the target object in the initial prop image to the target action, to obtain a customized prop image corresponding to the target online streamer.

Specifically, the current action is an action of the target object in the initial prop image or a most basic action of the target object. Alternatively, the current action may be empty. The customized prop image is a prop image generated after the action of the target object is changed.

Optionally, when the initial prop image includes various component parts of the target object, the current action of the target object is empty, and the various component parts may be combined based on the target action, to obtain the customized prop image corresponding to the target online streamer. For example, if the target object is a virtual character, the initial prop image includes parts such as the limbs, the head, and the body of the virtual character, and the target action is "squat", the limbs, the head, and the body of the virtual character are combined to obtain a customized prop image that includes a virtual character in a squatting state, that is, obtain the customized prop image corresponding to the target online streamer.

Optionally, when the initial prop image includes the target object as a whole, and the current action of the target object is an action of the target object in the initial prop image, the current action of the target object may be changed to the target action, to obtain the customized prop image corresponding to the target online streamer. For example, if the target object is a virtual character, the current action of the virtual character in the initial prop image is "stand", and the target action is "squat", the virtual character is changed from a standing state to a squatting state to obtain a customized prop image that includes a virtual character in a squatting state, that is, obtain the customized prop image corresponding to the target online streamer.

It should be noted that the action file may include a plurality of files, a plurality of target actions may be determined based on different file combinations, and then the current action of the target object in the initial prop image is separately updated based on each target action, to obtain a plurality of customized prop images corresponding to the target online streamer.

In addition, a type of the customized prop image depends on a file combination type. If the file combination type is a static combination file, the customized prop image is a static customized prop image. If the file combination type is a dynamic combination file, the customized prop image is a dynamic customized prop image.

For example, if there are two file combinations, and a first file combination is a static combination file, a target static action may be obtained, and the current action of the target object in the initial prop image is updated based on the target static action, to obtain a static customized prop image corresponding to the target online streamer. If a second file combination is a dynamic combination file, a target dynamic action may be obtained, and the current action of the target object in the initial prop image is separately updated based on each target dynamic action, to obtain a dynamic customized prop image corresponding to the target online streamer.

In addition, the customized prop image may be further generated by changing an image of the target object in the initial prop image, for example, adding or reducing an accessory, changing a color, replacing clothing, or modifying a hairstyle. That is, an initial prop image that includes a target object and an image file used to specify an image of the target object are obtained, where the initial prop image is an initial image of any prop in at least one prop held by a target online streamer; the image file is parsed to determine a target image corresponding to the image file; and a current image of the target object in the initial prop image is updated to the target image, to obtain a customized prop image corresponding to the target online streamer. In addition, the customized prop image may also be generated by changing the image of the target object in the initial prop image and based on the action file used to specify the action of the target object.

Based on the customized prop image generation method provided in this application, the initial prop image that includes the target object and the action file used to specify the action of the target object are obtained, where the initial prop image is an initial image of any prop in the at least one prop held by the target online streamer; the action file is parsed to determine the target action corresponding to the action file; and the current action of the target object in the initial prop image is updated to the target action, to obtain the customized prop image corresponding to the target online streamer. The current action of the target object in the initial prop image can be automatically updated by using the action file, to generate a customized prop image that is unique and distinctive, and props can be distinctive for different online streamers, so that props that can be obtained by different users can be specialized, thereby improving user experience.

In an optional embodiment of this specification, the action file includes at least one pose file and/or at least one expression file. Correspondingly, a specific implementation process of parsing the action file to determine a target action corresponding to the action file may be as follows:

generating at least one static combination file based on the at least one pose file and/or the at least one expression file, where the static combination file includes a pose file and/or an expression file; and parsing the static combination file to determine a target static action corresponding to the static combination file.

The updating a current action of the target object in the initial prop image to the target action, to obtain a customized prop image corresponding to the target online streamer includes:

updating the current action of the target object in the initial prop image to the target static action, to obtain a static customized prop image corresponding to the target online streamer.

Specifically, the pose file is used to specify a limb action or a pose action of the target object. The expression file is used to specify a facial action or an expression action of a target object. The target static action is a static target action, that is, a single target action. The static customized prop image is a customized prop image that is static, such as an image in a PNG format.

In actual application, the action file may include at least one pose file, may include at least one expression file, or may include at least one pose file and at least one expression file. When the action file includes at least one pose file, one or more pose files in the at least one pose file are used as a static combination file to obtain at least one static combination file. When the action file includes at least one expression file, one or more expression files in the at least one expression file are used as a static combination file to obtain at least one static combination file. When the action file includes at least one pose file and at least one expression file, different pose files and different expression files are combined to obtain at least one static combination file. Then, all static combination files are separately parsed to obtain target static actions corresponding to all the static combination files. Further, the current action of the target object in the initial prop image is updated by using each target static action, to obtain at least one static customized prop image corresponding to the target online streamer. In this way, a plurality of static customized prop images may be customized once, thereby improving customized prop image generation efficiency.

For example, the action file includes one pose file and two expression files, the pose file and a first expression file form a first static combination file, and the pose file and a second expression file form a second static combination file. A first target static action is determined based on the first static combination file, and the current action of the target object in the initial prop image is updated to the first target static action, to obtain a first static customized prop image corresponding to the target online streamer. A second target static action is determined based on the second static combination file, and the current action of the target object in the initial prop image is updated to the second target static action, to obtain a second static customized prop image corresponding to the target online streamer.

It should be noted that, when the action file includes at least one pose file and at least one expression file, the action file may further include another file such as a moving image generation file. When the static customized prop image is generated, only the pose file and the expression file may be combined.

Optionally, when the static combination file is parsed, the static combination file may be parsed as a whole to directly determine the target static action corresponding to the static combination file. In this way, efficiency of determining the target static action can be improved.

Optionally, when the static combination file is parsed, the pose file and/or the expression file in the static combination file may be separately parsed to obtain a target static pose and a target static expression. That is, the target static action includes a target static pose and/or a target static expression. Correspondingly, a specific implementation process of parsing the static combination file to determine a target static action corresponding to the static combination file may be as follows:

parsing the pose file in the static combination file to determine a target static pose corresponding to the pose file, and/or parsing the expression file in the static combination file to determine a target static expression corresponding to the expression file.

Specifically, the target static pose is a static action of a limb or a pose of the target object in the finally generated customized prop image. The target static expression is a static action of a face or an expression of the target object in the finally generated customized prop image.

In actual application, when the static combination file is parsed, the pose file and/or the expression file in the static combination file may be separately parsed. When the static combination file includes the pose file, the pose file is parsed to obtain the target static pose corresponding to the pose file. When the static combination file includes the expression file, the expression file is parsed to obtain the target static expression corresponding to the expression file. The target static pose and/or the target static expression form the target static action. In this way, files included in the static combination file are separately analyzed to obtain the target static action. This can improve accuracy and reliability of the target static action.

In one or more optional embodiments of this specification, after the target static pose and/or the target static expression are/is determined, the target static pose and/or the target static expression may be combined to obtain the target static action, and then the current action of the target object in the initial prop image is updated to the target static action. In this way, the static customized prop image corresponding to the target online streamer can be obtained by updating a current expression of the target object only once.

In one or more optional embodiments of this specification, the current action of the target object in the initial prop image may be separately updated based on the target static pose and the target static expression, to obtain the static customized prop image corresponding to the target online streamer. That is, a specific implementation process of updating the current action of the target object in the initial prop image to the target static action, to obtain a static customized prop image corresponding to the target online streamer may be as follows:

updating a current pose of the target object in the initial prop image to the target static pose, and/or updating a current expression of the target object in the initial prop image to the target static expression, to obtain the static customized prop image corresponding to the target online streamer.

Specifically, the current pose is an action corresponding to a limb or a pose in the current action. The current expression is an action corresponding to a face or an expression in the current action.

In actual application, if the target static action includes the target static pose and the target static expression, the current expression of the target object in the initial prop image may be updated to the target static expression while the current pose of the target object in the initial prop image is updated to the target static pose, to obtain the static customized prop image corresponding to the target online streamer. Alternatively, the current pose of the target object in the initial prop image may be first updated to the target static pose to obtain a standby customized prop image, and then the current expression of the target object in the standby customized prop image is updated to the target static expression, to obtain the static customized prop image corresponding to the target online streamer. Alternatively, the current expression of the target object in the initial prop image may be first updated to the target static expression, to obtain a standby customized prop image, and then the current pose of the target object in the standby customized prop image is updated to the target static pose, to obtain the static customized prop image corresponding to the target online streamer. In this way, the target static pose and the target static expression are separately used to update the current action of the target object in the initial prop image. This can improve accuracy and reliability of the static customized prop image.

If the target static action includes the target static pose or the target static expression, the current pose of the target object in the initial prop image is updated to the target static pose, to obtain the static customized prop image corresponding to the target online streamer, or the current expression of the target object in the initial prop image is updated to the target static expression, to obtain the static customized prop image corresponding to the target online streamer.

In another optional embodiment of this specification, the action file includes at least one pose file and/or at least one expression file, and includes at least one moving image generation file. Correspondingly, a specific implementation process of parsing the action file to determine a target action corresponding to the action file may be as follows:

generating at least one dynamic combination file based on the at least one pose file and/or the at least one expression file and the at least one moving image generation file, where the dynamic combination file includes a pose file and/or an expression file, and includes a moving image generation file; and parsing the dynamic combination file to determine a target dynamic action corresponding to the dynamic combination file.

The updating a current action of the target object in the initial prop image to the target action, to obtain a customized prop image corresponding to the target online streamer includes:

updating the current action of the target object in the initial prop image to the target dynamic action, to obtain a dynamic customized prop image corresponding to the target online streamer.

Specifically, the pose file is used to specify a limb action or a pose action of the target object. The expression file is used to specify a facial action or an expression action of a target object. The dynamic combination file is used to specify a plurality of consecutive actions generated by the target object. The target dynamic action is a dynamic target action, that is, a dynamic action obtained by combining a plurality of static actions. The dynamic customized prop image is a customized prop image that is dynamic, such as an image in a GIF format.

In actual application, the action file may include at least one pose file and at least one moving image generation file, may include at least one expression file and at least one moving image generation file, or may include at least one pose file, at least one expression file, and at least one moving image generation file. When the action file includes at least one pose file and at least one moving image generation file, all pose files and all moving image generation files are combined to obtain at least one dynamic combination file. When the action file includes at least one expression file and at least one moving image generation file, all expression files and all moving image generation files are combined to obtain at least one dynamic combination file. When the action file includes at least one pose file, at least one expression file, and at least one moving image generation file, different pose files may be combined with different expression files and different moving image generation files, to obtain at least one dynamic combination file, where the dynamic combination file includes a pose file, an expression file, and a moving image generation file. Then, all dynamic combination files are parsed to obtain target dynamic actions corresponding to all the dynamic combination file. Further, the current action of the target object in the initial prop image is updated by using each target dynamic action, to obtain at least one dynamic customized prop image corresponding to the target online streamer. In this way, a plurality of dynamic customized prop images may be customized once, thereby improving customized prop image generation efficiency.

For example, if the action file includes one pose file, two expression files, and one moving image generation file, the pose file, a first expression file composition, and the moving image generation file form a first dynamic combination file, and the pose file, a second expression file, and the moving image generation file form a second dynamic combination file. A first target dynamic action is determined based on the first dynamic combination file, and the current action of the target object in the initial prop image is updated to the first target dynamic action, to obtain a first dynamic customized prop image corresponding to the target online streamer. A second target dynamic action is determined based on the second dynamic combination file, and the current action of the target object in the initial prop image is updated to the second target dynamic action, to obtain a second dynamic customized prop image corresponding to the target online streamer.

Optionally, the moving image generation file is a quantity of image frames, and the quantity of image frames is greater than 1. A specific implementation process of parsing the dynamic combination file to determine a target dynamic action corresponding to the dynamic combination file may be as follows:

obtaining an initial action corresponding to the target object in the initial image, and parsing the pose file and/or the expression file in the dynamic combination file to determine a reference action; and determining, based on the initial action and the reference action, a target dynamic action that includes static actions of the quantity of image frames.

Specifically, the quantity of image frames is a quantity of image frames included in a moving image, and the quantity of image frames is a positive integer greater than or equal to 2. The initial action is an action of the target object in the initial prop image or a most basic action of the target object. The reference action is used to instruct to generate the target action, that is, is a reference of the target action.

In actual application, when the initial prop image includes various component parts of the target object, the various component parts are spliced to obtain the initial action corresponding to the target object. When the various component parts are spliced, a standard model may be obtained, and the various component parts are spliced to the standard model, to obtain the spliced target object. In this case, the action of the target object is the initial action. Alternatively, the various component parts may be directly spliced based on a composition of the target object, to obtain the spliced target object. In this case, the action of the target object is the initial action.

When the initial prop image includes the target object as a whole, the initial action of the target object is an action of the target object in the initial prop image.

When the initial action is obtained, the pose file and/or the expression file in the dynamic combination file are/is separately parsed, to obtain the reference action that includes a reference pose and/or a reference expression.

An example in which the quantity of image frames is N is used for description, and N is a positive integer greater than or equal to 2. An example in which the initial action is the first static action and the reference action is an $N^{th}$ static action is used. Interpolation is performed between the initial action and the reference action to obtain (N−2) static actions. Then, obtained N static actions are combined based on a specified sequence to obtain the target dynamic action. The specified sequence may be a sequence from the first static action to the $N^{th}$ static action, or may be a sequence from the $N^{th}$ static action to the first static action, or may be another sequence. This is not limited in this specification.

In this way, the quantity of image frames is added to the action file. Because the quantity of image frames is only a simple number, and has a small data amount, a dynamic action can be generated when a low data processing amount is ensured.

Optionally, the moving image generation file is a plurality of pieces of sequence frame information. A specific implementation process of parsing the dynamic combination file to determine a target dynamic action corresponding to the dynamic combination file may be as follows:

parsing the pose file and/or the expression file in the dynamic combination file to determine a reference action; and for each piece of sequence frame information, adjusting the reference action based on the sequence frame information to obtain a static action corresponding to the sequence frame information, where the target dynamic action includes static actions corresponding to all the sequence frame information.

Specifically, the sequence frame information is action information corresponding to image frames included in a moving image. The action information may be an action offset, and may be an adjustment action for a to-be-adjusted component part of the target object. The to-be-adjusted component part is a part whose action needs to be adjusted. If the target object is a virtual character, and a hand action of the virtual character needs to be adjusted, the hand is a to-be-adjusted component part.

In actual application, the pose file and the expression file in the dynamic combination file are separately parsed, to obtain the reference action that includes a reference pose and a reference expression.

When the sequence frame information is an action offset corresponding to an image frame, for each action offset, the reference action is adjusted based on the action offset, to obtain a static action corresponding to the action offset, that is, a static action corresponding to the sequence frame information. All the sequence frame information is traversed to obtain static actions corresponding to all the sequence frame information.

When the sequence frame information is an adjustment action of a to-be-adjusted component part of the target object in an image frame, for each adjustment action, the reference action is adjusted based on the adjustment action, so that the to-be-adjusted component part of the target object is the adjustment action, to obtain a static action corresponding to the adjustment action, that is, a static action corresponding to the sequence frame information. All the sequence frame information is traversed to obtain static actions corresponding to all the sequence frame information.

Further, the plurality of obtained static actions are combined based on a specified sequence to obtain the target dynamic action.

In this way, the adjustment action of the to-be-adjusted component part is added to the action file, to modify actions of some component parts of the target object. This can improve coherence and aesthetics of the target dynamic action, and further improve user viscosity.

It should be noted that after the target dynamic action that includes a plurality of static actions is obtained, the current action of the target object may be updated based on all the static actions, to obtain the dynamic customized prop image. That is, a specific implementation process of updating the current action of the target object in the initial prop image to the target dynamic action, to obtain a dynamic customized prop image corresponding to the target online streamer may be as follows:

for each static action included in the target dynamic action, updating the current action of the target object in the initial prop image to the static action, to obtain a static image corresponding to the static action; and performing splicing processing on all the static images to obtain the dynamic customized prop image corresponding to the target online streamer.

In actual application, for each static action of any target dynamic action, the static action is used to replace the current action of the target object in the initial prop image, to obtain a static image corresponding to the static action. All the static actions of the target dynamic action are traversed to obtain a plurality of static images. Further, the static images are spliced and combined based on a sequence in which the static actions form the target dynamic action, or another preset sequence, to obtain the dynamic customized prop image corresponding to the target online streamer. In this way, efficiency and accuracy of generating the dynamic customized prop image can be improved.

In addition, a background picture of the target object in the customized props image may be set after the customized prop image is generated. That is, after the updating a current action of the target object in the initial prop image to the target action, to obtain a customized prop image corresponding to the target online streamer, the method further includes:

identifying a theme color of the target object in the customized prop image; and setting a background picture of the target object in the customized prop image based on the theme color.

Specifically, the theme color is a color or a hue that plays a main role in the target object. The background picture is a picture in the customized prop image other than an ornament such as the target object and an accessory thereof.

In actual application, after the customized prop image is obtained, the theme color of the target object in the customized prop image may be identified to further beautify the customized prop image. For example, the theme color is a color or a hue that appears with a largest area on the target object, or the theme color is a color or a hue that appears most frequently on the target object. Then, the background picture that is in a same color scheme as the theme color is generated for or a matching color of the theme color is selected for the target object in the customized prop image, where the matching color is a color or a hue that matches the theme color to generate an effect appealing to the aesthetic taste of the public, and a background picture that mainly includes the matching color is generated for the target object in the customized prop image.

To improve uniqueness, scarcity, aesthetics, and traceability of the customized prop image, a digital collectible may also be generated for the customized prop image. That is, after the updating a current action of the target object in the initial prop image to the target action, to obtain a customized prop image corresponding to the target online streamer, the method further includes:

obtaining a digital collectible contract address; and generating a request used to create a digital collectible corresponding to the customized prop image, and sending the request to a blockchain, so that a digital collectible contract corresponding to the digital collectible contract address on the blockchain is used to create the digital collectible corresponding to the customized prop image based on the request.

Specifically, the digital collectible contract address is an address of a digital collectible contract deployed on a node of the blockchain. The digital collectible contract that is deployed on the blockchain and that is used to create a digital collectible may be determined by using the digital collectible contract address.

In actual application, after the customized prop image is generated, the digital collectible contract address is first obtained, and then the execution body generates the request used to create the digital collectible corresponding to the customized prop image, and sends the request to the blockchain. After receiving the request, the blockchain stores the customized prop image based on the digital collectible contract, converts a format of the customized prop image into a format suitable for storage in the blockchain, obtains a customized prop image whose format is converted, and generates a metadata file of the digital collectible corresponding to the customized prop image and stores the metadata file.

In addition, after the customized prop image is generated, the customized prop image may further be delivered to a corresponding target user when a prop delivery instruction is received. That is, after a user customizes the initial prop image by using the execution body, to generate the customized prop image, the user delivers the customized prop image to an account of the user.

For example, when the customized prop image is an avatar accessory, the customized prop image is added to an avatar of the target user. When the customized prop image is a virtual gift, the customized prop image is delivered to an account of the target user. When the customized prop image is a fan badge, the customized prop image is delivered to a badge display page of the target user. The virtual gift may be a card or a playing card.

In addition, when the initial prop image is a virtual image of an online streamer, a series of images corresponding to the virtual image may be generated, that is, customized prop images. In addition, different virtual images may be replaced by replacing the initial prop image, to generate a series of images corresponding to different virtual images.

Figure 3A:
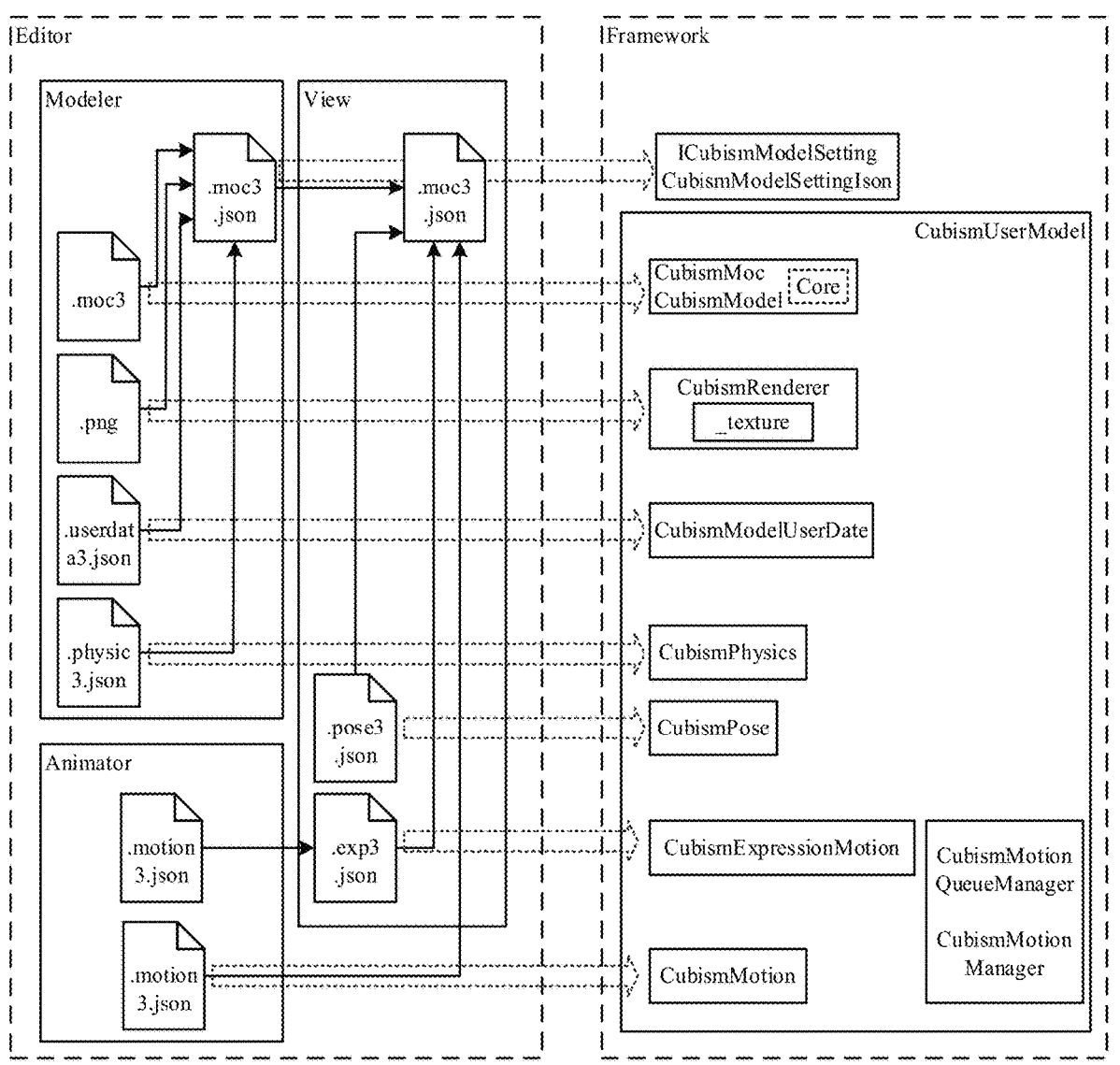
FIG. 3A is a schematic diagram of a structure of Live2D in a customized prop image generation method according to an embodiment of this application.

Then, the customized prop image generation method is described with reference to FIG. 3A to FIG. 3C. The customized prop image generation method may be generated based on Live2D or 3D. Live2D is used as an example for description. In Live2D, parameters that may be controlled by user input include two types: Params and Part Opacities. Params is used to control location rotation and a deformation effect of a Live2D image. Part Opacities is used to control transparency of each independent drawable unit in the Live2D image, and is generally used to display switching between poses of the Live2D model. FIG. 3A is a schematic diagram of a structure of Live2D in a customized prop image generation method according to an embodiment of this application. A complete Live2D model resource includes the following several parts: .moc3.json, which includes model metadata such as parameter vertex information and participates in core processing of a model computing process; .png, which is a material file of the model and stores color information required for rendering; .model3.json, which includes a relative path of the entire Live2D model resource in a directory and some configuration information required for running the model; .userdata3.json, which is user information that is set for an art resource in the model; .physic3.json, which is physical configuration of the model and is used to present a preset physical effect in a continuous image drawing process; .pose3.json, which is component grouping information (pose file) used to switch a model pose and includes a series of data for adjusting Part Opacities of the preset model; .motion3.json, which is configuration and sequence frame information (a moving image generation file corresponding to a plurality of pieces of sequence frame information) for model animation and includes a series of data for adjusting Params of the model based on a preset animation sequence; and .exp3.json, which is configuration information (expression file) for a model expression, includes a series of data for adjusting Params of the model based on presetting, and is generally used to present switching between character expressions. Live2D mainly includes two parts: an editor and a framework. The editor includes a modeler, a viewer, and an animator. The modeler includes .moc3.json, .png, .userdata3.json, and .physic3.json. The animator includes two pieces of .motion3.json. The viewer includes .moc3.json, .pose3.json, and .exp3.json. The framework includes an ICubismModelSetting CubismModelSettingIson means and a cubism user model. The cubism user model includes a CubismMoc CubismModel means including a core (Core), CubismRenderer including a text (texture), a CubismModelUserDate means, a CubismPhysics means, a CubismPose means, a CubismExpressionMotion means, a CubismMotion means, and a CubismMotionQueueManager CubismMotionManager means.

Figure 3B:
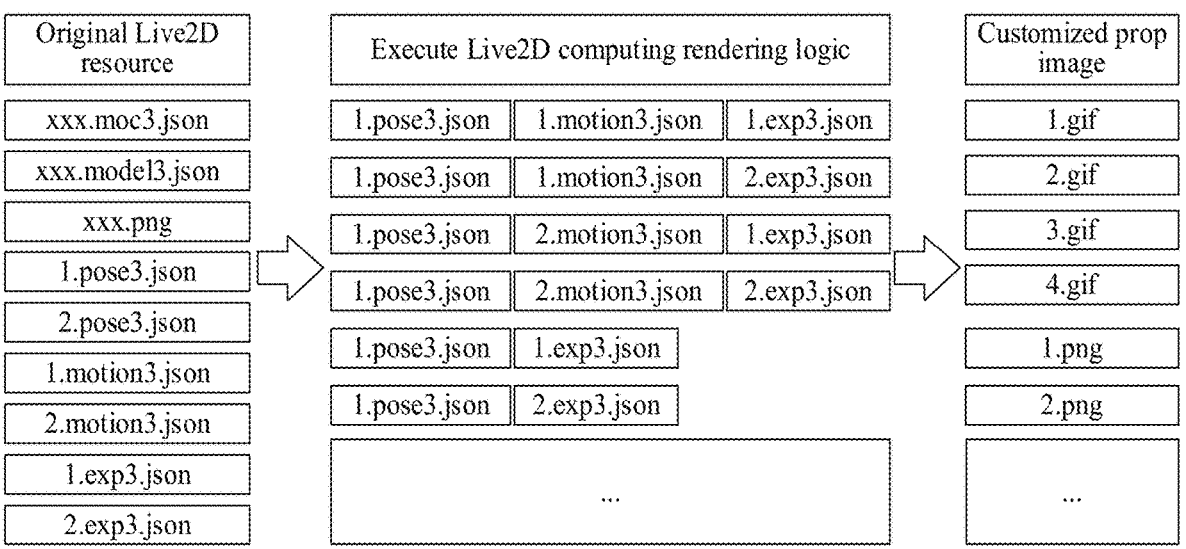
FIG. 3B is a processing flowchart of a customized prop image generation method according to an embodiment of this application.
Figure 3C:
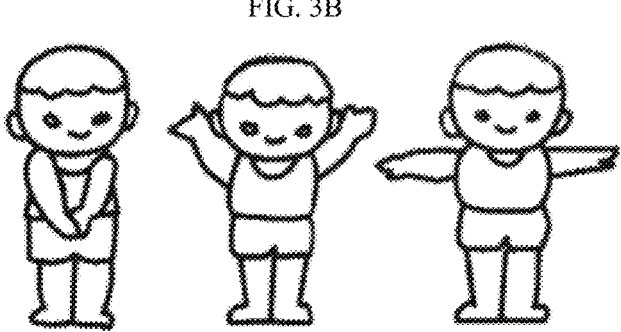
FIG. 3C shows a plurality of static customized prop images in a customized prop image generation method according to an embodiment of this application.

Then, FIG. 3B is a processing flowchart of a customized prop image generation method according to an embodiment of this application: An action file that includes a plurality of pieces of pose3.json, a plurality of pieces of motion3.json, and a plurality of pieces of exp3.json is obtained, for example, 1.pose3.json, 2.pose3.json, 1.motion3.json, 2.motion3.json, 1.exp3.json, and 2.exp3.json, and an initial prop image that includes a target object is obtained, that is, xxx.png. In addition, the action file, the initial prop image, and xxx.model3.json and xxx.moc3.json that are embedded in Live2D form an original Live2D model resource.

Next, Live2D computing rendering logic is executed. A plurality of combinations of pose3.json x exp3.json and pose3.json x exp3.json x motion3.json are generated from an existing configuration file. The combination of pose3.json x exp3.json is used to be input to a rendering program of the model to change the Params and Part Opacities parameters, so as to output a series of unique static customized prop images. The combination of pose3.json x exp3.json x motion3.json is used for continuous rendering based on a data sequence included in motion3.json, to output a series of unique dynamic customized prop images. For example, 1.pose3.json, 1.motion3.json, and 1.exp3.json form a dynamic combination file to generate a dynamic customized prop image1.gif. 1.pose3.json, 1.motion3.json, and 2.exp3.json form a dynamic combination file to generate a dynamic customized prop image 2.gif 1.pose3.json, 2.motion3.json, and 1.exp3.json form a dynamic combination file to generate a dynamic customized prop image 3.gif 1.pose3.json, 2.motion3.json, and 2.exp3.json form a dynamic combination file to generate a dynamic customized prop image 4.gif. 1.pose3.json and 1.motion3.json form a static combination file to generate a static customized prop image 1.png. 1.pose3.json and 2.motion3.json form a static combination file to generate a static customized prop image 2.png. Finally, the output customized prop images are stored and numbered. FIG. 3C shows a plurality of static customized prop images in a customized prop image generation method according to an embodiment of this application.

In this embodiment, a Live2D graphics rendering technology is combined with a digital collectible material generation process, to provide a function of conveniently outputting an existing Live2D model asset as a unique static or dynamic image material that can be used to distribute a digital collectible. A unique non-fungible card can be automatically generated based on different expressions, actions, or accessories of the live2d model, and is used to generate a customized prop for revenue interaction such as gift giving and card collection of a specific online streamer. The NFT attribute is added, so that the prop has uniqueness. This can improve scarcity of the prop and improve user motivation.

With reference to FIG. 3D, the following further describes the customized prop image generation method by using application of the customized prop image generation method provided in this application to a virtual gift as an example. FIG. 3D is a processing flowchart of a customized prop image generation method applied to a virtual gift according to an embodiment of this application. The method specifically includes the following steps:

Step 302: Obtain an initial prop image that includes a target object and an action file used to specify an action of the target object, where the initial prop image is an initial image of any virtual gift held by a target online streamer, and the action file includes at least one pose file, at least one expression file, and at least one moving image generation file.

The initial prop image is a model resource required for constructing a model.

Step 304: Generate at least one static combination file based on the at least one pose file and/or the at least one expression file, parse a pose file in the static combination file to determine a target static pose corresponding to the pose file, and parse an expression file in the static combination file to determine a target static expression corresponding to the expression file.

The static combination file includes a pose file and/or an expression file.

Step 306: Update a current pose of the target object in the initial prop image to the target static pose, and/or update a current expression of the target object in the initial prop image to the target static expression, to obtain a static customized prop image corresponding to the target online streamer.

Step 308: Generate at least one dynamic combination file based on the at least one pose file and/or the at least one expression file and the at least one moving image generation file.

The dynamic combination file includes a pose file and/or an expression file, and includes a moving image generation file.

Step 310: When the moving image generation file is a quantity of image frames, and the quantity of image frames is greater than 1, obtain an initial action corresponding to the target object in the initial image, parse the pose file and/or the expression file in the dynamic combination file to determine a reference action, and determine, based on the initial action and the reference action, a target dynamic action that includes static actions of the quantity of image frames.

Step 312: When the moving image generation file is a plurality of pieces of sequence frame information, parse the pose file and/or the expression file in the dynamic combination file to determine a reference action, and for each piece of sequence frame information, adjust the reference action based on the sequence frame information to obtain a static action corresponding to the sequence frame information, where the target dynamic action includes static actions corresponding to all the sequence frame information.

Step 314: For each static action included in the target dynamic action, update the current action of the target object in the initial prop image to the static action, to obtain a static image corresponding to the static action, and perform splicing processing on all the static images to obtain a dynamic customized prop image corresponding to the target online streamer.

Step 316: Identify a theme color of the target object in the customized prop image, and set a background picture of the target object in the customized prop image based on the theme color.

Step 318: Obtain a digital collectible contract address; and generate a request used to create a digital collectible corresponding to the customized prop image, and send the request to a blockchain, so that a digital collectible contract corresponding to the digital collectible contract address on the blockchain is used to create the digital collectible corresponding to the customized prop image based on the request.

Based on the customized prop image generation method provided in this application, the current action of the target object in the initial prop image can be automatically updated by using the action file, to generate a customized prop image that is unique and distinctive, and props can be distinctive for different online streamers, so that props that can be obtained by different users can be specialized, thereby improving user experience.

Corresponding to the foregoing method embodiments, this application further provides an embodiment of a customized prop image generation method applied to a client. FIG. 4 is a flowchart of another customized prop image generation method according to an embodiment of this application. The method is applied to a client, and specifically includes the following steps:

Step 402: Send a customized prop image generation request to a server, where the customized prop image generation request carries an initial prop image that includes a target object and an action file used to specify an action of the target object, and the initial prop image is an initial image of any prop in at least one prop held by a target online streamer.

Step 404: Receive a customized prop image that is fed back by the server and that corresponds to the target online streamer, where the customized prop image is obtained by updating a current action of the target object in the initial prop image based on a target action, and the target action is obtained by parsing the action file.

In actual application, the client may generate the customized prop image generation request based on the pre-obtained initial prop image and action file, and send the request to the server. Correspondingly, after receiving the customized prop image generation request that carries the initial prop image and the action file, the server parses the action file to determine the target action corresponding to the action file, and then updates the current action of the target object in the initial prop image to the target action, to obtain the customized prop image corresponding to the target online streamer, and feed back the customized prop image to the client. That is, the client receives the customized prop image that is fed back by the server and that corresponds to the target online streamer.

Optionally, the initial prop image and the action file that are carried in the customized prop image generation request may be uploaded by the target online streamer. That is, before the sending a customized prop image generation request to a server, the method further includes: receiving the initial prop image and the action file that are uploaded by the target online streamer; and generating the customized prop image generation request that carries the initial prop image and the action file.

Optionally, the initial prop image and the action file that are carried in the customized prop image generation request may be selected from a plurality of initial prop images and a plurality of action files that are obtained by the server, and may be randomly selected, or may be selected by the target online streamer. To ensure that the generated customized prop image better meets a user requirement and to improve user satisfaction, preferably, the initial prop image and the action file are selected by the target online streamer or a user. That is, before the sending a customized prop image generation request to a server, the method further includes:

sending a generation element obtaining request to the server, where the generation element obtaining request is used to obtain an element required for generating the customized prop image;
    receiving at least one initial prop image and at least one action file that are fed back by the server based on the generation element obtaining request;
    determining, from the at least one initial prop image, an initial prop image specified by the target online streamer, and determining, from the at least one action file, an action file specified by the target online streamer; and
    generating a customized prop image generation request that carries the specified initial prop image and the specified action file.

Specifically, a generation element is an element or a material required for generating the customized prop image.

In actual application, the target online streamer or the user generates the customized prop image by using a customized prop image generation page provided by the client. Correspondingly, the client detects a customized prop image generation requirement of the target online streamer or the user. For example, the user triggers a control on the customized prop image generation page such as "Obtaining materials" or "Obtaining elements". Correspondingly, the client receives the generation element obtaining request, and sends the request to the server.

Further, the server feeds back at least one initial prop image and at least one action file to the client in response to the generation element obtaining request. The at least one initial prop image and the at least one action file that are fed back may be all initial prop images and action files that can be obtained by the server, or may be an initial prop image and an action file that are found by the server based on the generation element obtaining request and that correspond to the target online streamer or the user.

Then, the client displays the at least one initial prop image and the at least one action file for selection by the target online streamer or the user. The user selects one initial prop image from the at least one initial prop image and one action file from the at least one action file. Correspondingly, the client receives a selection instruction for the at least one initial prop image and the at least one action file, where the selection instruction carries an image identifier and a file identifier. The client determines, from the at least one initial prop image based on the image identifier, the initial prop image specified by the target online streamer, and determines, from the at least one action file based on the file identifier, the action file specified by the target online streamer. Then, the client generates the customized prop image generation request that carries the specified initial prop image and the specified action file.

Based on the customized prop image generation method that is provided in this application and that is applied to the client, the current action of the target object in the initial prop image can be automatically updated by using the action file, to generate a customized prop image that is unique and distinctive, and props can be distinctive for different online streamers, so that props that can be obtained by different users can be specialized, thereby improving user experience.

A schematic solution of the customized prop image generation method applied to the client in this embodiment is described above. It should be noted that the technical solution of the customized prop image generation method applied to the client belongs to a same concept as the technical solution of the customized prop image generation method. For details not described in detail in the technical solution of the customized prop image generation method applied to the client, refer to the descriptions of the technical solution of the customized prop image generation method.

Corresponding to the foregoing method embodiments, this application further provides an embodiment of a customized prop image generation apparatus. FIG. 5 is a schematic diagram of a structure of a customized prop image generation apparatus according to an embodiment of this application. As shown in FIG. 5, the apparatus includes:

an obtaining means 502, configured to obtain an initial prop image that includes a target object and an action file used to specify an action of the target object, where the initial prop image is an initial image of any prop in at least one prop held by a target online streamer;
    a determining means 504, configured to parse the action file to determine a target action corresponding to the action file; and
    an update means 506, configured to update a current action of the target object in the initial prop image to the target action, to obtain a customized prop image corresponding to the target online streamer.

Optionally, the action file includes at least one pose file and/or at least one expression file; the determining means 504 is further configured to:

generate at least one static combination file based on the at least one pose file and/or the at least one expression file, where the static combination file includes a pose file and/or an expression file; and
    parse the static combination file to determine a target static action corresponding to the static combination file; and the update means 506 is further configured to:
    update the current action of the target object in the initial prop image to the target static action, to obtain a static customized prop image corresponding to the target online streamer.

Optionally, the target static action includes a target static pose and/or a target static expression; and the determining means 504 is further configured to:

parse the pose file in the static combination file to determine a target static pose corresponding to the pose file, and/or parse the expression file in the static combination file to determine a target static expression corresponding to the expression file.

Optionally, the update means 506 is further configured to:

update a current pose of the target object in the initial prop image to the target static pose, and/or update a current expression of the target object in the initial prop image to the target static expression, to obtain the static customized prop image corresponding to the target online streamer.

Optionally, the action file includes at least one pose file and/or at least one expression file, and includes at least one moving image generation file;

the determining means 504 is further configured to:

generate at least one dynamic combination file based on the at least one pose file and/or the at least one expression file and the at least one moving image generation file, where the dynamic combination file includes a pose file and/or an expression file, and includes a moving image generation file; and parse the dynamic combination file to determine a target dynamic action corresponding to the dynamic combination file; and the update means 506 is further configured to:

update the current action of the target object in the initial prop image to the target dynamic action, to obtain a dynamic customized prop image corresponding to the target online streamer.

Optionally, the moving image generation file is a quantity of image frames, and the quantity of image frames is greater than 1; and the determining means 504 is further configured to:

obtain an initial action corresponding to the target object in the initial image, and parse the pose file and/or the expression file in the dynamic combination file to determine a reference action; and determine, based on the initial action and the reference action, a target dynamic action that includes static actions of the quantity of image frames.

Optionally, the moving image generation file is a plurality of pieces of sequence frame information; and the determining means 504 is further configured to:

parse the pose file and/or the expression file in the dynamic combination file to determine a reference action; and for each piece of sequence frame information, adjust the reference action based on the sequence frame information to obtain a static action corresponding to the sequence frame information, where the target dynamic action includes static actions corresponding to all the sequence frame information.

Optionally, the update means 506 is further configured to:

for each static action included in the target dynamic action, update the current action of the target object in the initial prop image to the static action, to obtain a static image corresponding to the static action; and perform splicing processing on all the static images to obtain the dynamic customized prop image corresponding to the target online streamer.

Optionally, the apparatus further includes a setting means, configured to:

identify a theme color of the target object in the customized prop image; and set a background picture of the target object in the customized prop image based on the theme color.

Optionally, the apparatus further includes a sending means, configured to:

obtain a digital collectible contract address; and generate a request used to create a digital collectible corresponding to the customized prop image, and send the request to a blockchain, so that a digital collectible contract corresponding to the digital collectible contract address on the blockchain is used to create the digital collectible corresponding to the customized prop image based on the request.

Optionally, the initial prop image is a model resource required for constructing a model.

Based on the customized prop image generation apparatus provided in this application, the current action of the target object in the initial prop image can be automatically updated by using the action file, to generate a customized prop image that is unique and distinctive, and props can be distinctive for different online streamers, so that props that can be obtained by different users can be specialized, thereby improving user experience.

A schematic solution of the customized prop image generation apparatus in this embodiment is described above. It should be noted that the technical solution of the customized prop image generation apparatus belongs to a same concept as the technical solution of the customized prop image generation method. For details not described in detail in the technical solution of the customized prop image generation apparatus, refer to the descriptions of the technical solution of the customized prop image generation method.

Corresponding to the foregoing method embodiments, this application further provides an embodiment of a customized prop image generation apparatus applied to a client. FIG. 6 is a schematic diagram of a structure of another customized prop image generation apparatus according to an embodiment of this application. As shown in FIG. 6, the apparatus is applied to a client and includes:

a sending means 602, configured to send a customized prop image generation request to a server, where the customized prop image generation request carries an initial prop image that includes a target object and an action file used to specify an action of the target object, and the initial prop image is an initial image of any prop in at least one prop held by a target online streamer; and a receiving means 604, configured to receive a customized prop image that is fed back by the server and that corresponds to the target online streamer, where the customized prop image is obtained by updating a current action of the target object in the initial prop image based on a target action, and the target action is obtained by parsing the action file.

Optionally, the apparatus further includes a generation means, configured to:

send a generation element obtaining request to the server, where the generation element obtaining request is used to obtain an element required for generating the customized prop image; receive at least one initial prop image and at least one action file that are fed back by the server based on the generation element obtaining request;

determine, from the at least one initial prop image, an initial prop image specified by the target online streamer, and determine, from the at least one action file, an action file specified by the target online streamer; and generate a customized prop image generation request that carries the specified initial prop image and the specified action file.

Based on the customized prop image generation apparatus that is provided in this application and that is applied to the client, the current action of the target object in the initial prop image can be automatically updated by using the action file, to generate a customized prop image that is unique and distinctive, and props can be distinctive for different online streamers, so that props that can be obtained by different users can be specialized, thereby improving user experience.

A schematic solution of the customized prop image generation apparatus applied to the client in this embodiment is described above. It should be noted that the technical solution of the customized prop image generation apparatus applied to the client belongs to a same concept as the technical solution of the customized prop image generation method. For details not described in detail in the technical solution of the customized prop image generation apparatus applied to the client, refer to the descriptions of the technical solution of the customized prop image generation method.

Figure 7:
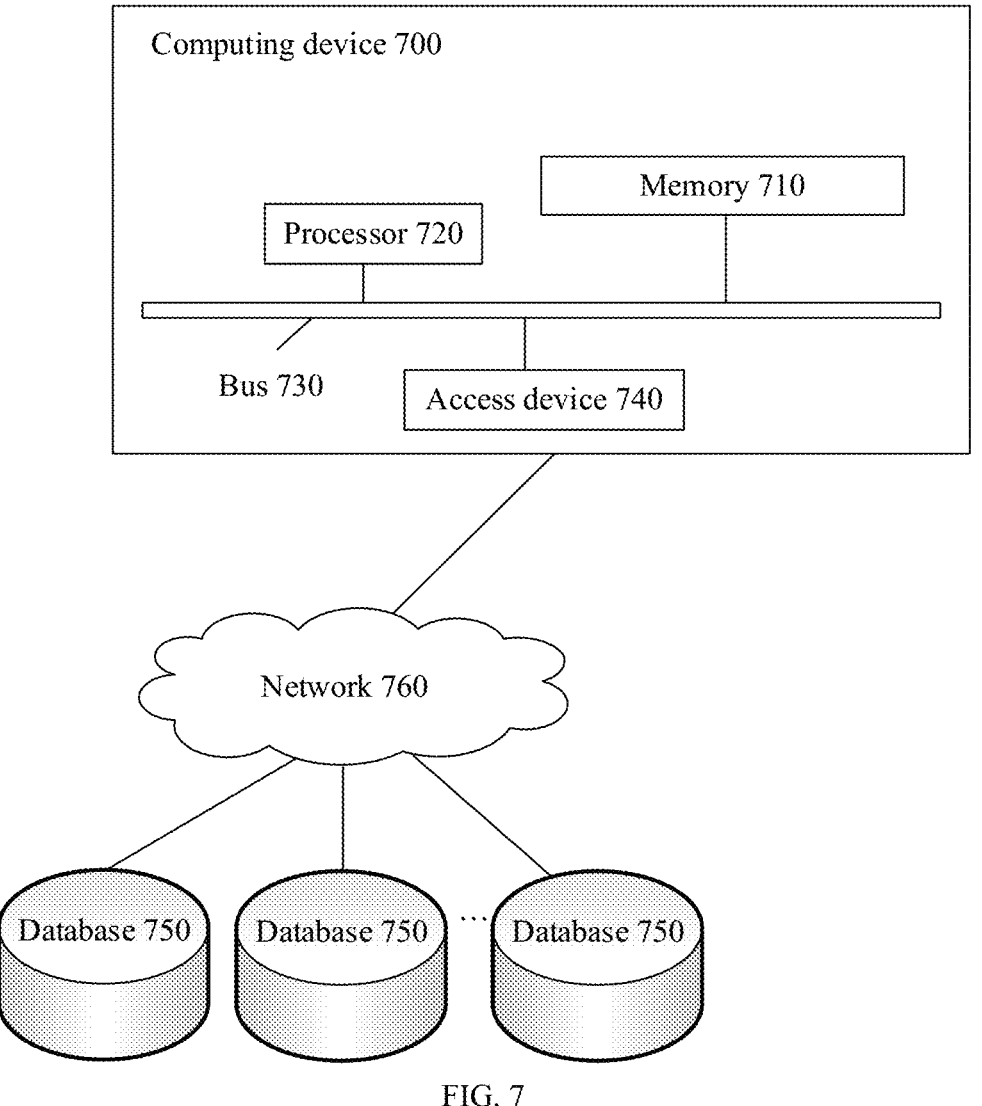
FIG. 7 is a block diagram of a structure of a computing device according to an embodiment of this application.

FIG. 7 is a block diagram of a structure of a computing device according to an embodiment of this application. Components of the computing device 700 include but are not limited to a memory 710 and a processor 720. The processor 720 is connected to the memory 710 by using a bus 730. A database 750 is configured to store data.

The computing device 700 further includes an access device 740. The access device 740 enables the computing device 700 to perform communication by using one or more networks 760.

Examples of these networks include a public switched telephone network (PSTN), a local area network (LAN), a wide area network (WAN), a personal area network (PAN), or a combination of communication networks such as the Internet. The access device 740 may include one or more of any type of wired or wireless network interface (for example, a network interface controller (NIC)), for example, an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, or a near field communication (NFC) interface.

In an embodiment of this application, the foregoing components of the computing device 700 and other components not shown in FIG. 7 may be connected to each other, for example, by using a bus. It should be understood that the block diagram of the structure of the computing device shown in FIG. 7 is merely used as an example instead of a limitation on the scope of this application. A person skilled in the art can add or replace other components as required.

The computing device 700 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), or another type of mobile device, or a stationary computing device such as a desktop computer or a PC. The computing device 700 may be alternatively a mobile or stationary server.

The processor 720 performs steps of the customized prop image generation method when executing the computer instructions.

A schematic solution of the computing device in this embodiment is described above. It should be noted that the technical solution of the computing device belongs to a same concept as the technical solution of the customized prop image generation method. For details not described in detail in the technical solution of the computing device, refer to the descriptions of the technical solution of the customized prop image generation method.

An embodiment of this application further provides a computer-readable storage medium, where the computer-readable storage medium stores computer instructions, and the computer instructions are executed by a processor to implement steps of the customized prop image generation method.

A schematic solution of the computer-readable storage medium in this embodiment is described above. It should be noted that the technical solution of the storage medium belongs to a same concept as the technical solution of the customized prop image generation method. For details not described in detail in the technical solution of the storage medium, refer to the descriptions of the technical solution of the customized prop image generation method.

Specific embodiments of this application are described above. Other embodiments fall within the scope of the appended claims. In some cases, actions or steps described in the claims may be performed in an order different from that in the embodiments and desired results may still be achieved. In addition, processes described in the accompanying drawings do not necessarily require shown specific orders or sequences to achieve the desired results. In some implementations, multitasking and parallel processing are also possible or may be advantageous.

The computer instructions include computer program code, and the computer program code may be in a source code form, an object code form, an executable file form, an intermediate form, or the like. The computer-readable medium may include: any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like.

It should be noted that, for brief description, the foregoing method embodiments are represented as a combination of a series of actions. However, a person skilled in the art should be aware that this application is not limited to the described order of the actions, because some steps may be performed in other orders or simultaneously according to this application. In addition, a person skilled in the art should also be aware that the embodiments described in this specification are all example embodiments, and used actions and means are not necessarily mandatory to this application.

In the foregoing embodiments, the descriptions of the embodiments have respective focuses.

For a part that is not described in detail in a specific embodiment, refer to related descriptions in other embodiments.

The example embodiments of this application disclosed above are merely intended to help describe this application. In the optional embodiments, not all details are described in detail, and the present invention is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof.

What is claimed is:

1. A method of generating customized prop images, comprising:
obtaining an initial prop image that comprises a target object, wherein the initial prop image comprises an initial image of any prop among at least one prop held by a target online streamer;

obtaining an action file configured to specify an action of the target object, wherein the action file comprises at least one pose file or at least one expression file, and the action file further comprises at least one moving image generation file;

parsing the action file to determine a target action corresponding to the action file, wherein the parsing the action file to determine a target action corresponding to the action file comprises:

generating at least one dynamic combination file based on the at least one moving image generation file and at least one of the at least one pose file or the at least one expression file, wherein the dynamic combination file comprises at least one of a pose file or an expression file, and the dynamic combination file comprises a moving image generation file, and parsing the dynamic combination file to determine a target dynamic action corresponding to the dynamic combination file; and generating a customized prop image by updating a current action of the target object in the initial prop image to the target action, wherein the generating a customized prop image by updating a current action of the target object in the initial prop image to the target action comprises generating a dynamic customized prop image by updating the current action of the target object in the initial prop image to the target dynamic action, and wherein the customized prop image corresponds to the target online streamer.

2. The method according to claim 1, wherein the action file comprises at least one pose file or at least one expression file, wherein the at least one pose file is configured to specify a limb action or a pose action of the target object, and wherein the at least one expression file is configured to specify a facial action or an expression action of the target object;

wherein the parsing the action file to determine a target action corresponding to the action file comprises:

generating at least one static combination file based on the at least one pose file or the at least one expression file, and parsing the at least one static combination file to determine a target static action corresponding to the at least one static combination file; and wherein the generating a customized prop image by updating a current action of the target object in the initial prop image to the target action comprises:

generating a static customized prop image by updating the current action of the target object in the initial prop image to the target static action.

3. The method according to claim 2, wherein the target static action comprises at least one of a target static pose or a target static expression, and wherein the generating a static customized prop image by updating the current action of the target object in the initial prop image to the target static action comprises:

generating the static customized prop image by replacing a current pose of the target object in the initial prop image with the target static pose; and generating the static customized prop image by replacing a current expression of the target object in the initial prop image with the target static expression.

4. The method according to claim 1, wherein the moving image generation file comprises information indicating a quantity of image frames in a sequence, and the quantity of image frames is greater than 1; and wherein the parsing the dynamic combination file to determine a target dynamic action corresponding to the dynamic combination file comprises:

obtaining an initial action corresponding to the target object in the initial image, determining a reference action based on parsing the pose file or the expression file in the dynamic combination file, and determining, based on the initial action and the reference action, the target dynamic action that comprises static actions in the quantity of image frames.

5. The method according to claim 1, wherein the moving image generation file comprises a plurality of pieces of sequence frame information, and each piece of sequence frame information indicates an action offset or an adjustment to a part of the target object in a corresponding image frame; and wherein the parsing the dynamic combination file to determine a target dynamic action corresponding to the dynamic combination file comprises:

determining a reference action based on parsing the pose file or the expression file in the dynamic combination file, and generating a static action corresponding to each piece of sequence frame information by adjusting the reference action based on each piece of sequence frame information, wherein the target dynamic action comprises a plurality of static actions corresponding to the plurality of pieces of sequence frame information.

6. The method according to claim 5, wherein the generating a customized prop image by updating a current action of the target object in the initial prop image to the target action comprises:

generating a plurality of static images corresponding to the plurality of static actions comprised in the target dynamic action by replacing the current action of the target object in the initial prop image with each of the plurality of static actions; and generating a dynamic customized prop image by performing splicing processing on the plurality of static images.

7. The method according to claim 1, wherein after generating the customized prop image, the method further comprises:

identifying a theme color of the target object in the customized prop image; and setting a background picture of the target object in the customized prop image based on the theme color.

8. The method according to claim 1, wherein after generating the customized prop image, the method further comprises:

obtaining a digital collectible contract address;

generating a request for creating a digital collectible corresponding to the customized prop image; and sending the request to a blockchain, wherein a digital collectible contract corresponding to the digital collectible contract address on the blockchain is configured to create the digital collectible corresponding to the customized prop image based on the request.

9. The method according to claim 1, wherein the initial prop image comprises a model resource required for constructing a model.

10. A computing device, comprising a memory and a processor, wherein the memory stores computer-readable instructions that upon execution by the processor cause the processor to perform operations comprising:

obtaining an initial prop image that comprises a target object, wherein the initial prop image comprises an initial image of any prop among at least one prop held by a target online streamer;

obtaining an action file configured to specify an action of the target object, wherein the action file comprises at least one pose file or at least one expression file, and the action file further comprises at least one moving image generation file;

parsing the action file to determine a target action corresponding to the action file, wherein the parsing the action file to determine a target action corresponding to the action file comprises:

generating at least one dynamic combination file based on the at least one moving image generation file and at least one of the at least one pose file or the at least one expression file, wherein the dynamic combination file comprises at least one of a pose file or an expression file, and the dynamic combination file comprises a moving image generation file, and parsing the dynamic combination file to determine a target dynamic action corresponding to the dynamic combination file; and generating a customized prop image by updating a current action of the target object in the initial prop image to the target action, wherein the generating a customized prop image by updating a current action of the target object in the initial prop image to the target action comprises generating a dynamic customized prop image by updating the current action of the target object in the initial prop image to the target dynamic action, and wherein the customized prop image corresponds to the target online streamer.

11. The computing device according to claim 10, wherein the action file comprises at least one pose file or at least one expression file, wherein the at least one pose file is configured to specify a limb action or a pose action of the target object, and wherein the at least one expression file is configured to specify a facial action or an expression action of the target object;

wherein the parsing the action file to determine a target action corresponding to the action file comprises:

generating at least one static combination file based on the at least one pose file or the at least one expression file, and parsing the at least one static combination file to determine a target static action corresponding to the at least one static combination file; and wherein the generating a customized prop image by updating a current action of the target object in the initial prop image to the target action comprises:

generating a static customized prop image by updating the current action of the target object in the initial prop image to the target static action.

12. The computing device according to claim 11, wherein the target static action comprises at least one of a target static pose or a target static expression, and wherein the generating a static customized prop image by updating the current action of the target object in the initial prop image to the target static action comprises:

generating the static customized prop image by replacing a current pose of the target object in the initial prop image with the target static pose; and generating the static customized prop image by replacing a current expression of the target object in the initial prop image with the target static expression.

13. The computing device according to claim 10, wherein the moving image generation file comprises information indicating a quantity of image frames in a sequence, and the quantity of image frames is greater than 1; and wherein the parsing the dynamic combination file to determine a target dynamic action corresponding to the dynamic combination file comprises:

obtaining an initial action corresponding to the target object in the initial image, determining a reference action based on parsing the pose file or the expression file in the dynamic combination file, and determining, based on the initial action and the reference action, the target dynamic action that comprises static actions in the quantity of image frames.

14. The computing device according to claim 10, wherein the moving image generation file comprises a plurality of pieces of sequence frame information, and each piece of sequence frame information indicates an action offset or an adjustment to a part of the target object in a corresponding image frame; and wherein the parsing the dynamic combination file to determine a target dynamic action corresponding to the dynamic combination file comprises:

determining a reference action based on parsing the pose file or the expression file in the dynamic combination file, and generating a static action corresponding to each piece of sequence frame information by adjusting the reference action based on each piece of sequence frame information, wherein the target dynamic action comprises a plurality of static actions corresponding to the plurality of pieces of sequence frame information.

15. The computing device according to claim 14, wherein the generating a customized prop image by updating a current action of the target object in the initial prop image to the target action comprises:

generating a plurality of static images corresponding to the plurality of static actions comprised in the target dynamic action by replacing the current action of the target object in the initial prop image with each of the plurality of static actions; and generating a dynamic customized prop image by performing splicing processing on the plurality of static images.

16. The computing device according to claim 10, wherein after generating the customized prop image, the operations further comprise:

identifying a theme color of the target object in the customized prop image; and setting a background picture of the target object in the customized prop image based on the theme color.

17. The computing device according to claim 10, wherein after generating the customized prop image, the operations further comprise:

obtaining a digital collectible contract address;

generating a request for creating a digital collectible corresponding to the customized prop image; and sending the request to a blockchain, wherein a digital collectible contract corresponding to the digital collectible contract address on the blockchain is configured to create the digital collectible corresponding to the customized prop image based on the request.

18. A non-transitory computer-readable storage medium, storing computer-readable instructions that upon execution by a processor cause the processor to implement operations comprising:

obtaining an initial prop image that comprises a target object, wherein the initial prop image comprises an initial image of any prop among at least one prop held by a target online streamer;

obtaining an action file configured to specify an action of the target object, wherein the action file comprises at least one pose file or at least one expression file, and the action file further comprises at least one moving image generation file;

parsing the action file to determine a target action corresponding to the action file, wherein the parsing the action file to determine a target action corresponding to the action file comprises:

generating at least one dynamic combination file based on the at least one moving image generation file and at least one of the at least one pose file or the at least one expression file, wherein the dynamic combination file comprises at least one of a pose file or an expression file, and the dynamic combination file comprises a moving image generation file, and parsing the dynamic combination file to determine a target dynamic action corresponding to the dynamic combination file; and generating a customized prop image by updating a current action of the target object in the initial prop image to the target action, wherein the generating a customized prop image by updating a current action of the target object in the initial prop image to the target action comprises generating a dynamic customized prop image by updating the current action of the target object in the initial prop image to the target dynamic action, and wherein the customized prop image corresponds to the target online streamer.

19. The non-transitory computer-readable storage medium of claim 18, wherein the moving image generation file comprises information indicating a quantity of image frames in a sequence; the quantity of image frames is greater than 1; and the parsing the dynamic combination file to determine a target dynamic action corresponding to the dynamic combination file comprises:

obtaining an initial action corresponding to the target object in the initial image, determining a reference action based on parsing the pose file or the expression file in the dynamic combination file, and determining, based on the initial action and the reference action, the target dynamic action that comprises static actions in the quantity of image frames.

20. The non-transitory computer-readable storage medium of claim 18, wherein the moving image generation file comprises a plurality of pieces of sequence frame information; each piece of sequence frame information indicates an action offset or an adjustment to a part of the target object in a corresponding image frame; and the parsing the dynamic combination file to determine a target dynamic action corresponding to the dynamic combination file comprises:

determining a reference action based on parsing the pose file or the expression file in the dynamic combination file, and generating a static action corresponding to each piece of sequence frame information by adjusting the reference action based on each piece of sequence frame information, wherein the target dynamic action comprises a plurality of static actions corresponding to the plurality of pieces of sequence frame information.

* * * * *